United States Patent
Wu et al.

(10) Patent No.: US 12,245,059 B2
(45) Date of Patent: Mar. 4, 2025

(54) TRANSMISSION METHOD AND COMMUNICATION DEVICE

(71) Applicant: VIVO MOBILE COMMUNICATION CO., LTD., Guangdong (CN)

(72) Inventors: Kai Wu, Guangdong (CN); Siqi Liu, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 400 days.

(21) Appl. No.: 17/576,585

(22) Filed: Jan. 14, 2022

(65) Prior Publication Data

US 2022/0141690 A1 May 5, 2022

Related U.S. Application Data (63) Continuation of application No. PCT/CN2020/101040, filed on Jul. 9, 2020.

(30) Foreign Application Priority Data

Jul. 15, 2019 (CN) .......................... 201910637795.X (51) Int. Cl.
*H04W 24/08* (2009.01)
*H04L 5/00* (2006.01)
(Continued)

(52) U.S. Cl.
CPC ........... *H04W 24/08* (2013.01); *H04L 5/0051* (2013.01); *H04W 56/001* (2013.01);
(Continued)

(58) Field of Classification Search
CPC ..... H04W 24/08; H04W 24/06; H04W 24/04; H04W 24/02; H04W 24/00; H04W 72/23; H04W 72/20; H04W 72/25; H04W 72/27; H04W 72/29; H04W 72/0044; H04W 72/04; H04W 72/1273; H04W 72/1263;
(Continued)

(56) References Cited

U.S. PATENT DOCUMENTS

2018/0376511 A1 12/2018 Tsai et al.
2019/0140776 A1* 5/2019 Seo ....................... H04B 7/0456
(Continued)

FOREIGN PATENT DOCUMENTS

CN 107949064 A 4/2018
CN 108633052 A 10/2018
(Continued)

OTHER PUBLICATIONS

Discussion on multi-beam operation for NR-PDCCH, 3GPP TSG RAN WG1 Meeting #90, Aug. 21-25, 2017, p. 1-5, R1-1712394, CATT, Prague, Czechia.
(Continued)

*Primary Examiner* — Phong La
(74) *Attorney, Agent, or Firm* — IP & T GROUP LLP (57) ABSTRACT

A transmission method includes: transmitting a PDCCH in a first CORESET, where the number of RBs in the first CORESET is less than or equal to the number of RBs in a second CORESET, and the second CORESET is configured by higher layer signaling in a PBCH.

20 Claims, 4 Drawing Sheets

(51) Int. Cl.
| | |
|---|---|
| *H04W 56/00* | (2009.01) |
| *H04W 72/04* | (2023.01) |
| *H04W 72/044* | (2023.01) |
| *H04W 72/12* | (2023.01) |
| *H04W 72/1273* | (2023.01) |
| *H04W 72/23* | (2023.01) |

(52) U.S. Cl.
CPC ..... *H04W 72/044* (2013.01); *H04W 72/1273* (2013.01); *H04W 72/23* (2023.01)

(58) Field of Classification Search
CPC ............ H04W 56/001; H04W 56/0005; H04L 5/0051; H04L 5/005; H04L 5/0048
See application file for complete search history.

(56) References Cited

U.S. PATENT DOCUMENTS

| | | | | |
|---|---|---|---|---|
| 2019/0150123 A1* | 5/2019 | Nogami | ................. | H04W 72/23 370/330 |
| 2019/0158205 A1* | 5/2019 | Sheng | .................... | H04L 5/0048 |
| 2019/0215807 A1* | 7/2019 | Hwang | ..................... | H04L 5/00 |
| 2020/0022087 A1* | 1/2020 | Dou | ....................... | H04W 52/40 |
| 2020/0053670 A1* | 2/2020 | Jung | ...................... | H04W 56/00 |
| 2020/0053757 A1* | 2/2020 | Bagheri | ............. | H04W 72/0446 |
| 2021/0006376 A1* | 1/2021 | Cirik | ...................... | H04W 72/23 |
| 2021/0007086 A1 | 1/2021 | Liu et al. | | |
| 2021/0045042 A1* | 2/2021 | Nakashima | ............ | H04W 72/23 |
| 2021/0136770 A1* | 5/2021 | Nakashima | ............ | H04W 72/53 |
| 2021/0351865 A1* | 11/2021 | Ouchi | ..................... | H04W 8/24 |
| 2022/0141690 A1* | 5/2022 | Wu | ........................ | H04L 5/0094 370/329 |
| 2022/0272681 A1* | 8/2022 | Harada | ................. | H04W 48/12 |

FOREIGN PATENT DOCUMENTS

| | | | | |
|---|---|---|---|---|
| CN | 109644452 | A | | 4/2019 |
| CN | 109802789 | A | | 5/2019 |
| CN | 109803389 | A | | 5/2019 |
| CN | 109803402 | A | | 5/2019 |
| CN | 110291828 | A * | 9/2019 | ........... H04L 5/0094 |
| CN | 110535542 | A * | 12/2019 | ............. H04B 17/30 |
| CN | 111034145 | B * | 9/2022 | ............. H04L 5/001 |
| EP | 3490184 | A1 | | 5/2019 |
| WO | 2018/128427 | A1 | | 7/2018 |

OTHER PUBLICATIONS

Discussion on multi-beam operation for NR-PDCCH, 3GPP TSG RAN WG1 NR Ad-Hoc#2, Jun. 27-30, 2017, p. 1-4, R1-1710078, CATT, Qingdao, P.R. China.
Remaining details on RACH procedure, 3GPP TSG RAN WG1 Meeting RAN1#92, Feb. 26-Mar. 2, 2018, p. 1-10, R1-1802022, Nokia, Nokia Shanghai Bell, Athens, Greece.
The First Office Action of Priority Application No. CN 201910637795.X issued by the Chinese Patent Office on Apr. 6, 2021.
The Second Office Action of Priority Application No. CN 201910637795.X issued by the Chinese Patent Office on Sep. 18, 2021.
International Search Report and Written Opinion of Priority Application No. PCT/CN2020/101040 issued by the Chinese Patent Office on Sep. 28, 2020.
Nokia et al., Remaining details on search space, R1-1802538, 3GPP TSG RAN WG1 #92, Feb. 26-Mar. 2, 2018, Athens, Greece.
Extended European Search Report for European Patent Application No. 20840294.1 issued by the European Patent Office on Jun. 28, 2022.

* cited by examiner

TRANSMISSION METHOD AND COMMUNICATION DEVICE

CROSS-REFERENCE TO RELATED APPLICATIONS

This application is a Bypass Continuation application of PCT/CN2020/101040 filed on Jul. 9, 2020, which claims priority to Chinese Patent Application No. 201910637795.X filed on Jul. 15, 2019, which are incorporated herein by reference in their entirety.

TECHNICAL FIELD

The present disclosure relates to the field of communications technologies, and in particular, to a transmission method and a communications device.

BACKGROUND

In some communications systems, a physical downlink control channel (PDCCH) such as system information may be transmitted in a control resource set (CORESET). However, if only one CORESET is configured, there may be a case in which a terminal cannot transmit the PDCCH in this CORESET, and consequently, PDCCH receiving performance of the terminal is relatively poor.

SUMMARY

According to a first aspect, an embodiment of the present disclosure provides a transmission method, applied to a communications device and including: transmitting a PDCCH in a first CORESET, where the number of resource blocks (RB) in the first CORESET is less than or equal to the number of RBs in a second CORESET, and the second CORESET is configured by higher layer signaling in a physical broadcast channel (PBCH).

According to a second aspect, an embodiment of the present disclosure provides a communications device, including:
- a transmission module, configured to transmit a PDCCH in a first CORESET, where the number of resource blocks RBs in the first CORESET is less than or equal to the number of RBs in a second CORESET, and the second CORESET is configured by higher layer signaling in a physical broadcast channel.

According to a third aspect, an embodiment of the present disclosure further provides a communications device, including a memory, a processor, and a program that is stored in the memory and executable on the processor, and when the program is executed by the processor, steps of the transmission method provided in the embodiment of the present disclosure are implemented.

According to a fourth aspect, an embodiment of the present disclosure further provides a non-transitory computer-readable storage medium, where the non-transitory computer-readable storage medium stores a computer program, and when the computer program is executed by a processor, steps of the transmission method provided in the embodiment of the present disclosure are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

The term "include" and any modification thereof in the specification and claims of this application are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" is used in the specification and claims to indicate at least one of connected objects, for example, A and/or B indicates three cases: only A exists, only B exists, or both A and B exist.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The embodiments of the present disclosure are described below with reference to the accompanying drawings. A transmission method and a communications device provided in the embodiments of the present disclosure may be applied to a wireless communications system. The wireless communications system may be a 5G system, an evolved long term evolution (eLTE) system, a long term evolution (LTE) system, a subsequent evolved communications system, or the like.

Figure 1:
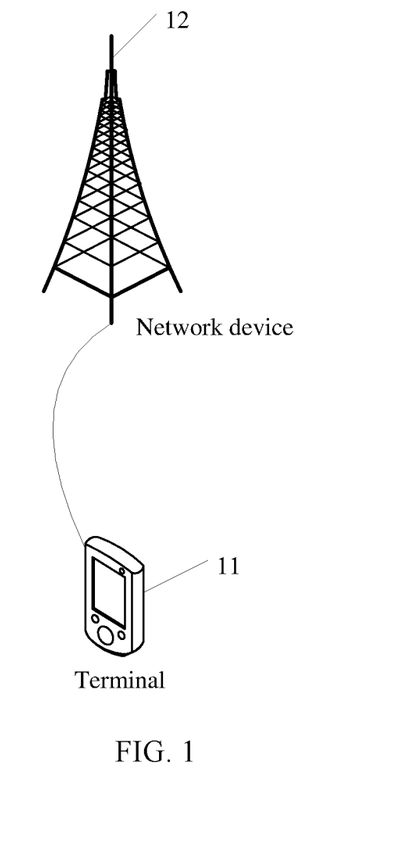
FIG. 1 is a structural diagram of a network system to which an embodiment of the present disclosure is applicable.

FIG. 1 is a structural diagram of a network system to which an embodiment of the present disclosure is applicable. As shown in FIG. 1, the network system includes a terminal 11 and a network device 12. The terminal 11 may be user equipment (UE) or another terminal device side device such as a mobile phone, a tablet personal computer, a laptop computer, a personal digital assistant (PDA), a mobile internet device (MID), a wearable device, or a robot. It should be noted that a specific type of the terminal 11 is not limited in the embodiments of the present disclosure. The network device 12 may be a 4G base station, a 5G base station, a base station of a later version, or a base station in another communications system, or may be referred to as a NodeB, an evolved NodeB, a transmission reception point (TRP), an access point (AP), or another word in the field. The network device is not limited to a specific technical term provided that a same technical effect is achieved. In addition, the network device 12 may be a master node (MN) or a secondary node (SN). It should be noted that in the embodiments of the present disclosure, only the 5G base station is used as an example, but a specific type of the network device is not limited.

It should be noted that the communications device in this embodiment of the present disclosure may be a terminal or a network device. In this embodiment of the present disclosure, the terminal is mainly used as an example for description.

Figure 2:
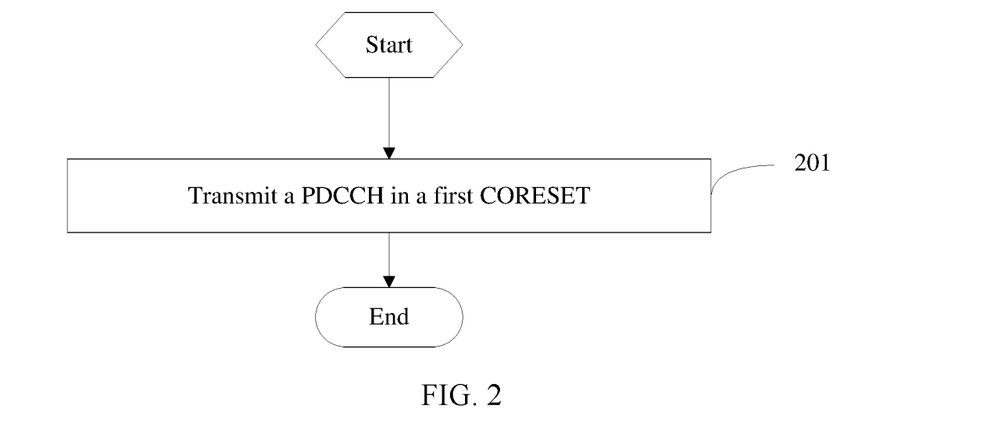
FIG. 2 is a flowchart of a transmission method according to an embodiment of the present disclosure.

FIG. 2 is a flowchart of a transmission method according to an embodiment of the present disclosure. The method is applied to a communications device. As shown in FIG. 2, the method includes the following steps.

Step 201: Transmit a PDCCH in a first CORESET, where the number of RBs in the first CORESET is less than or equal to the number of RBs in a second CORESET, and the second CORESET is configured by higher layer signaling in a PBCH.

The first CORESET may be a CORESET used to transmit system information, for example, a first CORESET #0, and the second CORESET may also be a CORESET used to transmit system information, for example, a second CORESET #0, and the first CORESET and the second CORESET may be used to transmit same system information. In addition, a resource of the first CORESET #0 may be different from a resource of the second CORESET #0, and the second CORESET #0 is CORESET #0 defined in a protocol (for example, defined in Rel-15). Because the number of RBs in the first CORESET is less than or equal to the number of RBs in the second CORESET, bandwidth of the first CORESET #0 is less than or equal to bandwidth of the second CORESET #0. In addition, the first CORESET and the second CORESET may be associated with a same SSB or a same PBCH on a same SSB.

Figure 3:
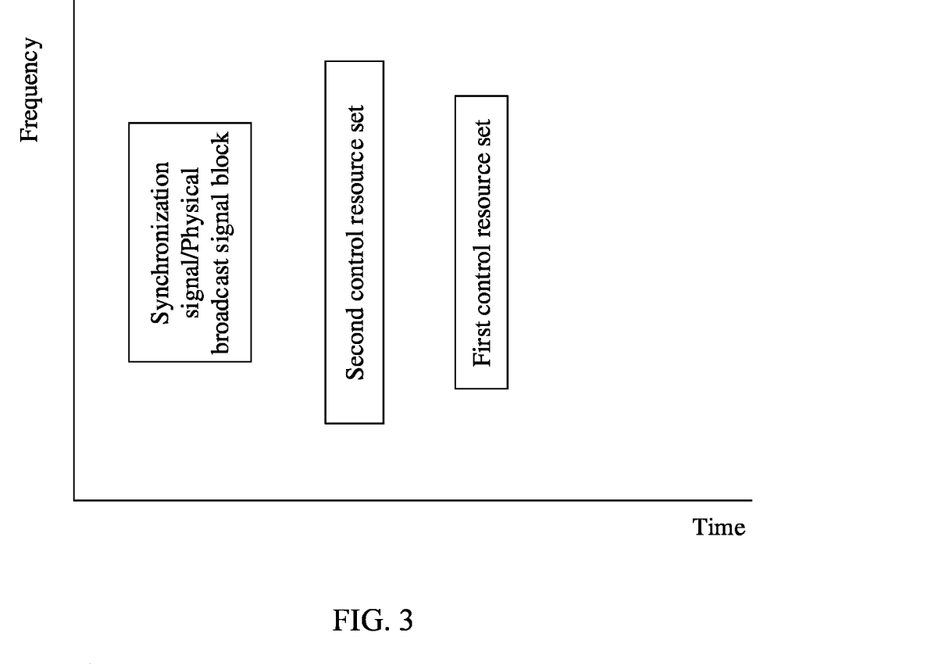
FIG. 3 is a schematic diagram of a CORESET resource according to an embodiment of the present disclosure.

In addition, in this embodiment of the present disclosure, the RB included in the first CORESET may be the same as an RB included in a first initial downlink bandwidth part (initial DL BWP), and the RB included in the second CORESET may be the same as an RB included in a second initial DL BWP. In addition, the number of RBs in the first CORESET is less than or equal to the number of RBs in the second CORESET. In this way, to ensure that a narrowband terminal with a reduced capability can also access a network, a new definition of a narrowband initial DL BWP is introduced, so that the terminal may work on narrower bandwidth. For example, a technical effect shown in FIG. 3 is achieved. In addition, as shown in FIG. 3, a synchronization signal block (SSB) may be further deployed in the network, and a PBCH in the SSB may indicate an initial DL BWP (for example, the second initial DL BWP) of broadband. The second CORESET may be configured by higher layer signaling on the PBCH.

For the terminal, the foregoing transmitting a PDCCH in the first CORESET may be: monitoring the PDCCH, and for the network, the foregoing transmitting a PDCCH in the CORESET may be: sending the PDCCH. The PDCCH may be a scheduling PDCCH, and the scheduling PDCCH may include at least one of: a PDCCH for scheduling a system information block (SIB) 1, a PDCCH for scheduling system information (SI message), a PDCCH for scheduling a random access response (RAR), a PDCCH for scheduling an uplink message 3 (MSG3) physical uplink shared channel (PUSCH), a PDCCH for scheduling a message 4 (MSG4), a PDCCH for scheduling UE-specific data, a group common PDCCH, or the like.

In this embodiment of the present disclosure, two CORESETs can be configured by using the foregoing steps, to improve PDCCH receiving performance of the terminal, and the terminal can receive the PDCCH in a timely manner. For example, a new narrowband initial DL BWP is configured, that is, a new CORESET #0 resource is determined, and further, a PDCCH and a physical downlink shared channel (PDSCH) may be transmitted on the narrowband initial DL BWP. For details, reference is made to the following descriptions.

In an optional implementation, the PDCCH is a type-0PDCCH.

The type-0 PDCCH may be a type-0 PDCCH defined in a protocol, and the second CORESET may also be used to transmit the type-0 PDCCH, to support two CORESETs used to transmit the type-0 PDCCH. In this way, the terminal can receive the type-0 PDCCH in a corresponding CORESET according to a capability of the terminal, so that the terminal can receive the type-0 PDCCH in a timely manner.

In an optional implementation, a resource parameter of the first CORESET is a default parameter or a resource parameter indicated by the network; or a resource parameter of the first CORESET is determined based on a resource parameter of the second CORESET.

That the resource parameter of the first CORESET is a default parameter may be that all or some resource parameters of the first CORESET are default parameter values. In this way, transmission overheads can be reduced.

That the resource parameter of the first CORESET is a resource parameter indicated by the network may be that all or some resource parameters of the first CORESET may be resource parameters indicated by the network. In this way, the first CORESET can be flexibly configured. For example, the network may implicitly indicate the resource parameter of the first CORESET, for example, directly indicates a parameter value of the resource parameter of the first CORESET.

That the resource parameter of the first CORESET is determined based on the resource parameter of the second CORESET may be that all or some resource parameters of the first CORESET are determined based on the resource parameter of the second CORESET, and the determining based on the resource parameter of the second CORESET herein may be: directly determining based on the resource parameter of the second CORESET without requiring a network indication. In this way, transmission overheads can be reduced.

In addition, some resource parameters of the first CORESET may be default resource parameters, and the other resource parameters may be determined according to a network indication or determined based on the resource parameter of the second CORESET.

In an optional implementation, a resource parameter of the first CORESET is determined based on a correspondence between the resource parameter of the first CORESET and a resource parameter of the second CORESET, and the correspondence is indicated by the network.

The foregoing correspondence may be a ratio, an offset, or the like between the resource parameter of the first CORESET and the resource parameter of the second CORESET. Because the foregoing correspondence may be used for indication, signaling overheads can be reduced.

In an optional implementation, the resource parameter of the first CORESET includes at least one of:

bandwidth, a frequency location, a start RB, the number of symbols, or physical downlink control channel search space (PDCCH search space).

It should be noted that some or all parameters herein may be default, some or all parameters are indicated by the network, or some or all parameters are determined based on the resource parameter of the second CORESET.

Bandwidth is used as an example, and a default parameter may be used for bandwidth of the first CORESET. For example, it is assumed that the bandwidth is a default value of 24 RBs or 48 RBs. Alternatively, the bandwidth of the first CORESET is indicated by the network, and if the network indicates a size of the first CORESET relative to the second CORESET, for example, the network indicates that a scaling factor is ½, the bandwidth of the first CORESET is ½ of bandwidth of the second CORESET.

A frequency location (RB offset) is used as an example. A frequency location of the first CORESET may be default, for example, 0, 2, 4, 6, or 8, or may be indicated by the network. For example, the network indicates a specific value of an RB OFFSET of the first CORESET or a size configured relative to an RB offset of the second CORESET, for example, is the same as the RB offset of the second CORESET, or ½ of the RB offset of the second CORESET.

The foregoing symbol may be an orthogonal frequency division multiplexing (OFDM) symbol. The OFDM symbol is used as an example. A default parameter may be used for the number of OFDM symbols of the first CORESET. It is assumed that the number of OFDM symbols of the first CORESET is a determined value, for example, 2, 3, or 4. Alternatively, the number of OFDM symbols of the first CORESET is indicated by the network, and the network indicates a specific value of the number of OFDM symbols of the first CORESET or a size configured relative to the number of OFDM symbols of the second CORESET.

Similarly, a start RB in the first CORESET may be default or indicated by the network.

Optionally, in the case that the start RB is a default parameter, the start RB is:

determined by performing offset on a start RB of the second CORESET; or determined by performing offset on a start RB of an SSB; or determined based on bandwidth of the second CORESET, bandwidth for SSB transmission, and bandwidth of the first CORESET.

The foregoing "being determined by performing offset on a start RB of the second CORESET" may be: the start RB in the first CORESET is offset by one or more RBs of the start RB of the second CORESET. The "being determined by performing offset on a start RB of an SSB" may be that the start RB in the first CORESET is offset by one or more RBs of the start RB of the SSB.

The foregoing "being determined based on bandwidth of the second CORESET, bandwidth for SSB transmission, and bandwidth of the first CORESET" may be: determining the start RB of the CORESET based on a relationship between the bandwidth of the second CORESET, the bandwidth for SSB transmission, and the bandwidth of the first CORESET. For example, if the bandwidth of the second CORESET is the same as the bandwidth of the first CORESET, and the bandwidth of the second CORESET includes bandwidth of the SSB, the start RB in the first CORESET may be the start RB of the second CORESET.

Optionally, the RB in the first CORESET includes an RB used for transmitting an SSB, and/or all RBs in the first CORESET are included in an RB set of the second CORESET.

It should be noted that the RB in the first CORESET includes an RB used for transmitting an SSB, and all RBs in the first CORESET are included in an RB set of the second CORESET for indication. The RB in the first CORESET includes an RB used for transmitting an SSB, and all RBs in the first CORESET are included in an RB set of the second CORESET.

Figure 4:
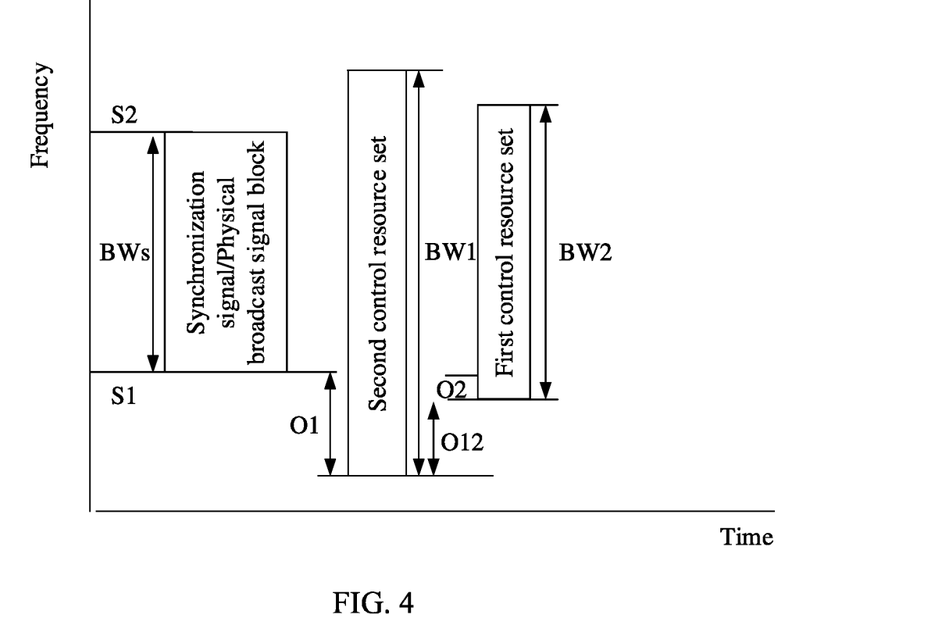
FIG. 4 is a schematic diagram of another CORESET resource according to an embodiment of the present disclosure.

In this implementation, the bandwidth of the first CORESET can include all RBs for transmitting an SSB, and all RB resources of the first CORESET can be included in an RB resource range of the first CORESET. For example, this is shown in FIG. 4.

It should be noted that this implementation may be implemented in combination with the foregoing implementation of determining the start RB. For example, the number of offset RBs between the start RB and the start RB of the SSB is a minimum offset value or a maximum offset value.

In the case that an RB in the first CORESET includes an RB used to transmit the SSB and/or all RBs in the first CORESET are included in an RB set of the second CORESET, the minimum offset value is the minimum number of offset RBs between the start RB and the start RB of the SSB.

In the case that an RB in the first CORESET includes an RB used to transmit the SSB and/or all RBs in the first CORESET are included in an RB set of the second CORESET, the maximum offset value is the maximum number of offset RBs between the start RB and the start RB of the SSB.

It should be noted that, when the RB in the first CORESET includes the RB used to transmit the SSB, or when all RBs in the first CORESET are included in the RB set of the second CORESET, or when the RB in the first CORESET includes the RB used for transmitting an SSB and all RBs in the first CORESET are included in the RB set of the second CORESET, there may be multiple values of the start RB in the first CORESET, that is, when the start RB in the first CORESET is any one of the multiple values, the foregoing condition is met. In this implementation, the start RB in the first CORESET may be the minimum number of offset RBs or the maximum number of offset RBs, so that the first CORESET includes a maximum or minimum quantity of RBs.

That the condition "the bandwidth of the first CORESET can include all RBs used for transmitting an SSB and all RB resources of the first CORESET are included in an RB resource range of the second CORESET" is met is used as an example for description below.

As shown in FIG. 4, S1 and S2 respectively represent a start RB and an end RB of the SSB, O1 represents the number of offset RBs of a start RB of the second CORESET and the start RB of the SSB, BW1 represents bandwidth of the second CORESET, BW2 represents bandwidth of the first CORESET, O12 represents a start RB of the second CORESET and a start RB of the first CORESET, and O2 represents the number of offset RBs of the start RB in the first CORESET and the start RB of the SSB. In this way, O12 is obtained, so that O12≤S1, O12+BW2≤BW1, where BWs=S2−S1+1 is the number of RBs of the SSB. S1=O1−1 is a number of the first RB for transmitting the SSB, and the number starts to be counted by using a carrier #0 of an RB #0 of a first CORESET #0 (broadband CORESET #0).

Figure 5:
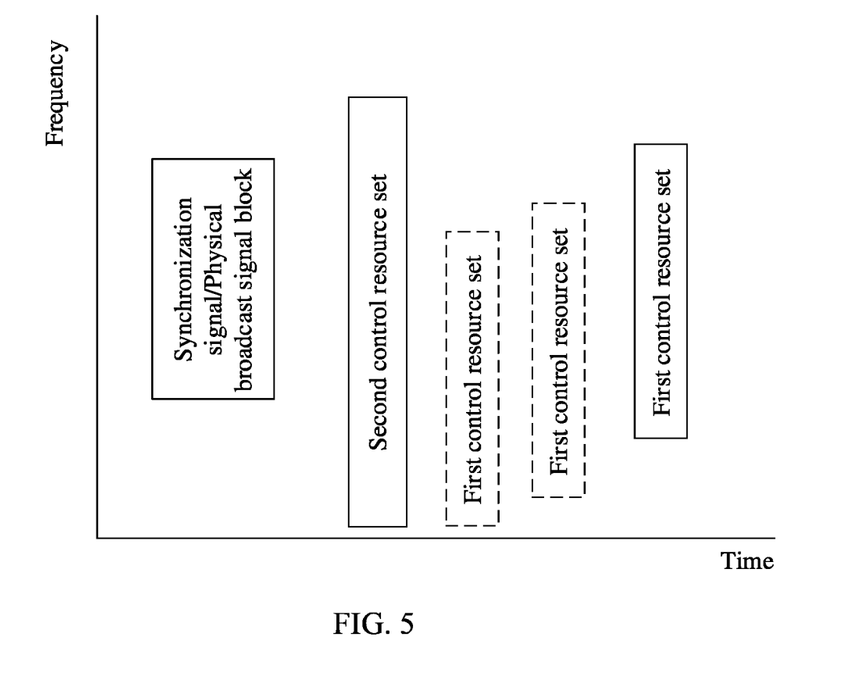
FIG. 5 is a schematic diagram of another CORESET resource according to an embodiment of the present disclosure.

In one manner, starting from the start RB of the second CORESET configured by the network, the first RB that meets the foregoing condition may be found as the start RB in the first CORESET by sliding upward by using X RBs as a granularity, where X may be 1, 2, . . . . For example, as shown in FIG. 5, the third CORESET is found as the first CORESET, and the first two CORESETs may be ignored.

For example, the following formula may be used to reflect a number of the start RB in the first CORESET:

$$O_{12} = \mathrm{argmin}_{k}\{k \leq O_1 \text{ and } k + BW_2 \geq S_2\},$$

where k is in a unit of RB, and may be a natural number set starting from 0 in a unit of one or two RBs, where $O_2 = O_1 - O_{12}$.

In another manner, starting from the start RB of the second CORESET configured by the network, the last RB that meets the foregoing condition may be found as the start RB of the second CORESET by sliding upward by using X RBs as a granularity, where X may be 1, 2, . . . .

For example, the following formula may be used to reflect a number of the start RB in the first CORESET:

$$O_{12} = \mathrm{argmin}_{k}\{k + BW_2 \leq BW_1 \text{ and } k + BW_2 \geq S_2\},$$

where k is in a unit of RB, and may be a natural number set starting from 0 in a unit of one or two RBs.

In another manner, the number of the start RB in the first CORESET may be reflected based on the following formula:

$$O_{12}^{L} = \max\{BW_s/2, (S_1+S_2)/2\} - BW_s/2$$

$$O_{12}^{U} = \min\{BW_1 - BW_s/2, (S_1+S_2)/2\} + BW_s/2 - BW_2$$

$$O_{12} = \mathrm{ceil}(\min\{O_{12}^{U}, O_{12}^{L}\}) \text{ or } O_{12} = \mathrm{floor}(\min\{O_{12}^{U}, O_{12}^{L}\})$$

In this way, $O_2 = O_1 - O_{12}$.

In other words, the start RB in the first CORESET may be determined based on the bandwidth of the second CORESET, the bandwidth for synchronization signal block (SSB) transmission, and the bandwidth of the first CORESET.

Certainly, in this embodiment of the present disclosure, determining of the start RB in the first CORESET is not limited to the foregoing manner. For example, when it is not limited that a condition that all RB resources in the first CORESET are included in an RB resource range of the second CORESET is met, a simple rule may be used, that is, $O_2$ is configured as a fixed value by default, and in network deployment, it is ensured that the default configuration can ensure that the resource of the first CORESET is within channel bandwidth of the network.

Optionally, the PDCCH search space is type-0 PDCCH search space; where a monitoring occasion (monitoring occasion) of the type-0 PDCCH search space is a monitoring occasion of type-0 PDCCH search space in the second CORESET; or a monitoring occasion of the type-0 PDCCH search space is on a first OFDM symbol in a slot in which a monitoring occasion of type-0 PDCCH search space in the second CORESET is located, and the monitoring occasion of the type-0 PDCCH search space in the second CORESET is on a second OFDM symbol in the slot; or a monitoring occasion of the type-0 PDCCH search space is an occasion with an offset relative to a monitoring occasion of type-0 PDCCH search space in the second CORESET.

The foregoing type-0 PDCCH search space may be a default parameter or indicated by the network. For example, when the foregoing type-0 PDCCH search space uses the default parameter, the monitoring occasion of the foregoing type-0 PDCCH search space may be a monitoring occasion corresponding to the type-0 PDCCH search space in the second CORESET, or the monitoring occasion of the foregoing type-0 PDCCH search space may be a time resource that has a fixed offset relative to a monitoring occasion corresponding to the type-0 PDCCH search space in the second CORESET, and the fixed offset may be an offset in a unit of a frame, a half-frame, a subframe, a slot, or an OFDM symbol. When the network indicates some parameters of the type-0 PDCCH search space, the monitoring occasion of the type-0 PDCCH search space is the occasion with the offset relative to the monitoring occasion of the type-0 PDCCH search space in the second CORESET, where the offset may be an offset of a frame, a half-frame, a subframe, a slot, or an OFDM symbol.

It should be noted that in this embodiment of the present disclosure, a parameter of the type-0 PDCCH search space may include at least one of:

O: Offset of a subframe;

M: Time granularity of a monitoring slot of a PDCCH associated with adjacent S SBs;

N: Number of search space sets in each slot;

First symbol index: Start OFDM symbol for monitoring the PDCCH in a slot.

For example, when the type-0 PDCCH search space of the first CORESET is a default parameter, the terminal may assume that same search space having same configuration as the type-0 PDCCH search space in the second CORESET is used. Alternatively, monitoring is performed on a time resource with a default time offset. For example, there is a determined offset of a subframe, a slot, or a symbol between a time resource monitored by using the type-0 PDCCH search space of the first CORESET and a time resource of the type-0 PDCCH search space in the second CORESET. For example, monitoring is performed on a sixth or a seventh OFDM symbol in a slot that is the same as monitoring in the type-0 PDCCH search space in the second CORESET. Alternatively, monitoring is performed on a next half-frame (5 ms) or a slot of a frame (10 ms) after a monitoring slot in the type-0 PDCCH search space in the second CORESET.

In an optional implementation, in the case that the communications device is a terminal, a demodulation reference signal (DMRS) for receiving the PDSCH scheduled by the PDCCH in the first CORESET is configured as follows:

a DMRS configuration indicated in the PBCH and used for PDSCH reception; or an offset of a DMRS configuration indicated in the PBCH and used for PDSCH reception; or a default DMRS configuration; or a configuration of an OFDM symbol in which a first OFDM symbol of a type-A DMRS is located.

The foregoing type-A DMRS is a type-A DMRS defined in a protocol, for example, a location in the PBCH that can indicate the type-A DMRS.

In this implementation, the DMRS for receiving the PDSCH scheduled by the PDCCH in the first CORESET can be configured as a default DMRS configuration, or the terminal uses an OFDM symbol index in which the first OFDM symbol of a default type-A DMRS or a type-A DMRS indicated by the network is located, for example, an OFDM symbol 3 (counting from 0).

In addition, for the DMRS for receiving the PDSCH scheduled by the PDCCH in the first CORESET, a DMRS configuration indicated in the PBCH and used for PDSCH reception, for example, determining by offsetting Y symbols by using a same configuration or based on the DMRS configuration indicated in the PBCH and used for PDSCH reception. The DMRS configuration indicated in the PBCH and used for PDSCH reception may be a DMRS configuration indicated in the PBCH and used for PDSCH reception on the second BWP, where the second BWP may be an initial BWP that includes RBs that are same as RBs included in the second CORESET, and receiving the PDSCH scheduled by the PDCCH in the first CORESET may be receiving the PDSCH received in the first BWP, and the first BWP may be an initial BWP that includes RBs that are the same as the RBs included in the first CORESET.

In this implementation, the DMRS configuration can be reduced to reduce transmission overheads.

In an optional implementation, in the case that the communications device is a terminal, the transmitting the PDCCH in the first CORESET includes:
monitoring the PDCCH in PDCCH search space in the first CORESET; where
the monitoring PDCCH includes: performing monitoring by using a default first monitoring parameter as an assumption, or performing monitoring by using a second monitoring parameter, where the second monitoring parameter corresponds to a monitoring parameter for monitoring the PDCCH in PDCCH search space in the second CORESET.

The first monitoring parameter may include at least one of:
a DMRS reference point, the number of downlink control information (DCI) bits, a resource element group (REG bundle) size, or an interleave size (interleave size).

The DMRS reference point may be a start subcarrier (SC) of the start RB of the second CORESET. For example, in the case that the PDCCH is monitored in the PDCCH search space in the first CORESET, an SC #0 of the RB #0 of the second CORESET is used as a DMRS reference point of the PDCCH, and the reference point is a subcarrier generated by a DMRS sequence.

The number of DCI bits is the number of DCI bits of a corresponding format for monitoring the PDCCH in the PDCCH search space in the second CORESET. For example, in the case that the PDCCH is monitored in the PDCCH search space in the first CORESET, the bandwidth of the second BWP is used as a DCI size.

The REG bundle size may be a REG bundle size for monitoring the PDCCH in the PDCCH search space in the second CORESET. For example, in the case that the PDCCH is monitored in the PDCCH search space in the first CORESET, an REG bundle size for monitoring the PDCCH in the PDCCH search space in the second CORESET is used.

The interleave size may be an interleave size for monitoring the PDCCH in the PDCCH search space in the second CORESET. For example, in the case that the PDCCH is monitored in the PDCCH search space in the first CORESET, an interleave size for monitoring the PDCCH in the PDCCH search space in the second CORESET is used.

Certainly, some or all of the foregoing parameters may also use default parameters, for example, an assumption of a default REG bundle size and a default interleave size is used, for example, an REG bundle size and an interleave size that are the same as those of the first type-0 PDCCH are used for monitoring.

Optionally, whether the terminal performs monitoring by using the first monitoring parameter as an assumption is indicated by the network, to flexibly configure behavior of the terminal. For example, the behavior may be indicated by using a PBCH, a system information block (SIB), an RRC, a MAC-CE, or a PDCCH.

In an optional implementation, in the case that the communications device is a terminal, the method further includes:
receiving a PDSCH scheduled by a PDCCH, where the PDSCH is received in a first BWP, and an RB included in the first BWP is the same as an RB included in the first CORESET; where
the PDSCH is received by using a first receiving parameter as an assumption, the first receiving parameter corresponds to a second receiving parameter, and the second receiving parameter is a receiving parameter of a PDSCH scheduled by a type-0 PDCCH transmitted in the second CORESET.

The first BWP may be an initial BWP, that is, may be referred to as a first initial BWP.

The first receiving parameter may include at least one of:
a DMRS reference point or a precoding resource block group (PRG) size; wherein
the DMRS reference point is an SC of a start RB of the second CORESET or a default parameter. For example, during receiving of the PDSCH scheduled by the PDCCH, an SC #0 of an RB #0 of the second BWP is used as a reference point of a DMRS of the PDSCH.

The PRG size may be a PRG size for receiving the PDSCH in the second CORESET, and the PRG is divided from the start RB of the second CORESET, or is a default parameter, for example, during receiving of the PDSCH scheduled by the PDCCH, an assumption that is the same as a PRG size of the second BWP is used, to perform partitioning from the RB #0 of the second BWP.

Optionally, whether the terminal performs receiving by using the first receiving parameter as an assumption is indicated by the network, to flexibly configure behavior of the terminal. For example, the behavior may be indicated by using a PBCH, an SIB, an RRC, a MAC-CE, or a PDCCH.

In an optional implementation, in the case that the communications device is a terminal, whether the terminal performs receiving in the first CORESET is indicated by the network; or
the terminal performs receiving in the first CORESET by using a resource parameter of the first CORESET as an assumption, and if a first system information block (SIB1) is successfully received, it is determined that transmission of the first CORESET is performed in the network.

The foregoing network indication may be explicit indication of the network, and the information is explicitly indicated by a PBCH or system information. Certainly, the foregoing network indication may alternatively be implicit indication. This is not limited.

The foregoing SIB may be a SIB1 defined in the protocol.

That the terminal performs receiving in the first CORESET by using the resource parameter of the first CORESET as an assumption, and if the first system information block is successfully received, it is determined that the first CORE- SET is transmitted in the network may be: The terminal performs receiving by using the resource in the first CORESET as an assumption, and if the resource parameter is different from the resource parameter of the second CORESET, and the SIB1 is successfully received, it is determined that the first CORESET is transmitted in the network. For example, the terminal receives a first type-0 PDCCH (a PDCCH in the first CORESET) by using a parameter of narrow bandwidth as an assumption. If the received parameter is different from a parameter received on a second type-0 PDCCH (a PDCCH in the second CORESET), and the terminal can successfully receive the first type-0 PDCCH, it is considered that the first CORESET is transmitted in the network. That the first CORESET is transmitted may also be understood as that the first BWP is transmitted, because RBs included in the first BWP are the same as RBs included in the first CORESET.

For example, lower two bits in the PBCH corresponding to an SSB index may be used on a network side to indicate whether the first CORESET is transmitted in the network.

For example, $\bar{a}_{\bar{A}+6}, \bar{a}_{\bar{A}+7^{th}}$ bits are used for indication, where $\bar{A}$ is the number of bits generated by a higher layer, and eight bits at a physical layer are $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}$.

Alternatively, $\bar{a}_{\bar{A}-1}$ is used for indication, and $\bar{a}_{\bar{A}-1}$ is the last bit in bits generated by a higher layer.

The foregoing information may directly indicate whether the network supports the terminal in performing receiving in the first CORESET of the narrowband. The terminal may determine the first CORESET and a configuration of first search space #0 of the first CORESET based on the foregoing default parameter assumption or rule.

Alternatively, the information is used to indicate the bandwidth of the first CORESET, an RB OFFSET, a parameter of the first search space #0, a DMRS configuration parameter, and the like. If the terminal detects these fields, obtains the information, and a corresponding bit location is 0, it is considered that the network does not support transmission of the first CORESET of the narrowband. Otherwise, it is considered that the network supports transmission of the first CORESET of the narrowband, and the terminal may perform receiving in the first CORESET of the narrowband.

For some terminals (for example, a terminal of an old version), that is, a terminal that supports reading of the second CORESET and a second type-0-PDCCH common search space set (CSS set) configuration, it is meaningless to indicate these bits or code points, and a receiving method on the first start BWP is still determined based on information other than these bits. For a terminal that can determine, by reading the information transmitted by the PBCH, that the SSB is associated with the first CORESET, the first type-0 PDCCH CSS set, and the first initial BWP, the first CORESET, the first type-0 PDCCH CSS set, the first initial BWP, and a corresponding receiving parameter may be used as receiving assumptions to perform receiving. In this way, the indication information does not affect working of a normal terminal on a PBCH-indicated broadband initial downlink BWP in a related technology, thereby ensuring compatibility.

In an optional implementation, all RBs in the first CORESET are part of RBs of the second CORESET.

In this implementation, because all RBs in the first CORESET are part of RBs of the second CORESET, the terminal is supported to work on relatively narrow bandwidth, so that power consumption of the terminal UE is reduced.

For example, a same resource is used for the first CORESET and the second CORESET to transmit system information.

That a same resource is used for the first CORESET and the second CORESET to transmit system information may be transmitting the SIB by using a same PDCCH resource and a same PDSCH resource. For example, a PDCCH actually received by the terminal and a PDSCH transmitted on the SIB are the same. In this way, overheads are reduced from a network perspective.

In this embodiment of the present disclosure, a PDCCH is transmitted in a first CORESET, where the number of RBs in the first CORESET is less than or equal to the number of RBs in a second CORESET, and the second CORESET is configured by higher layer signaling in a PBCH. In this way, two CORESETs can be configured, to improve PDCCH receiving performance of a terminal.

Figure 6:
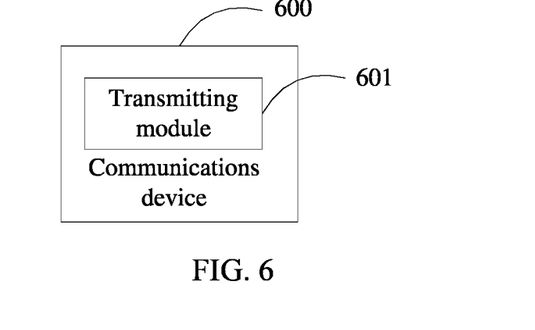
FIG. 6 is a structural diagram of a communications device according to an embodiment of the present disclosure.

FIG. 6 is a structural diagram of a network device according to an embodiment of the present disclosure. As shown in FIG. 6, a network device 600 includes:

a transmission module 601, configured to transmit a PDCCH in a first CORESET, where the number of resource blocks RBs in the first CORESET is less than or equal to the number of RBs in a second CORESET, and the second CORESET is configured by higher layer signaling in a PBCH.

Optionally, the PDCCH is of a type-0 PDCCH.

Optionally, a resource parameter of the first CORESET is a default parameter or a resource parameter indicated by the network; or a resource parameter of the first CORESET is determined based on a resource parameter of the second CORESET.

Optionally, a resource parameter of the first CORESET is determined based on a correspondence between the resource parameter of the first CORESET and a resource parameter of the second CORESET, and the correspondence is indicated by the network.

Optionally, the resource parameter of the first CORESET includes at least one of:

bandwidth, a frequency location, a start RB, the number of symbols, or PDCCH search space.

Optionally, in the case that the start RB is a default parameter, the start RB is:

determined by performing offset on a start RB of the second CORESET; or determined by performing offset on a start RB of an SSB; or determined based on bandwidth of the second CORESET, bandwidth for SSB transmission, and bandwidth of the first CORESET.

Optionally, the RB in the first CORESET includes an RB used for transmitting an SSB, and/or all RBs in the first CORESET are included in an RB set of the second CORESET.

Optionally, the number of offset RBs between the start RB and the start RB of the SSB is a minimum offset value or a maximum offset value.

In the case that an RB in the first CORESET includes an RB used to transmit the SSB and/or all RBs in the first CORESET are included in an RB set of the second CORESET, the minimum offset value is the minimum number of offset RBs between the start RB and the start RB of the SSB.

In the case that an RB in the first CORESET includes an RB used to transmit the SSB and/or all RBs in the first CORESET are included in an RB set of the second CORE- SET, the maximum offset value is the maximum number of offset RBs between the start RB and the start RB of the SSB.

Optionally, the PDCCH search space is type-0 PDCCH search space; where
- a monitoring occasion of the type-0 PDCCH search space is a monitoring occasion of type-0 PDCCH search space in the second CORESET; or
- a monitoring occasion of the type-0 PDCCH search space is on a first OFDM symbol in a slot in which a monitoring occasion of type-0 PDCCH search space in the second CORESET is located, and the monitoring occasion of the type-0 PDCCH search space in the second CORESET is on a second OFDM symbol in the slot; or
- a monitoring occasion of the type-0 PDCCH search space is an occasion with an offset relative to a monitoring occasion of type-0 PDCCH search space in the second CORESET.

Optionally, in the case that the communications device is a terminal, a DMRS configuration for receiving the physical downlink shared channel (PDSCH) scheduled by the PDCCH in the first CORESET is as follows:
- a DMRS configuration indicated in the PBCH and used for PDSCH reception; or
- an offset of a DMRS configuration indicated in the PBCH and used for PDSCH reception; or
- a default DMRS configuration; or
- a configuration of an OFDM symbol in which a first OFDM symbol of a type-A DMRS is located.

Optionally, in the case that the communications device is a terminal, the transmission module 601 is configured to monitor the PDCCH in the PDCCH search space in the first CORESET; where
- the monitoring PDCCH includes: performing monitoring by using a default first monitoring parameter as an assumption, or performing monitoring by using a second monitoring parameter, where the second monitoring parameter corresponds to a monitoring parameter for monitoring the PDCCH in PDCCH search space in the second CORESET.

Optionally, the first monitoring parameter includes at least one of:
- a DMRS reference point, the number of DCI bits, a REG bundle size, or an interleave size. Optionally, the DMRS reference point is a start subcarrier SC of a start RB of the second CORESET; and/or
- the quantity of DCI bits is the number of DCI bits of a corresponding format for monitoring a PDCCH in PDCCH search space in the second CORESET; and/or
- the REG bundle size is a REG bundle size for monitoring a PDCCH in PDCCH search space in the second CORESET; and/or
- the interleave size is an interleave size for monitoring a PDCCH in PDCCH search space in the second CORESET.

Optionally, whether the terminal performs monitoring by using the first monitoring parameter as an assumption is indicated by a network.

Figure 7:
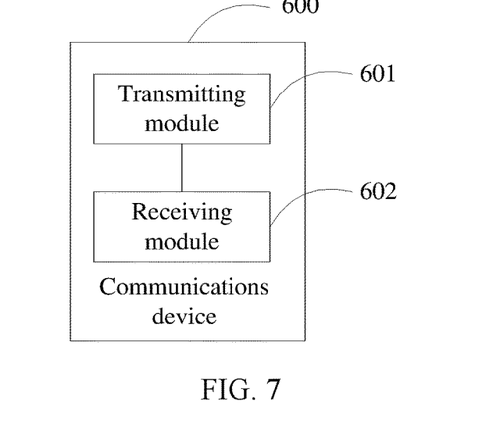
FIG. 7 is a structural diagram of another communications device according to an embodiment of the present disclosure.

Optionally, in the case that the communications device is a terminal, as shown in FIG. 7, the communications device 600 further includes:
- a receiving module 602, configured to receive a PDSCH scheduled by a PDCCH, where the PDSCH is received in a first BWP, and an RB included in the first BWP is the same as an RB included in the first CORESET; where the PDSCH is received by using a first receiving parameter as an assumption, the first receiving parameter corresponds to a second receiving parameter, and the second receiving parameter is a receiving parameter of a PDSCH scheduled by a type-0 PDCCH transmitted in the second CORESET.

Optionally, the first receiving parameter includes at least one of:
- a DMRS reference point or a precoding resource block group PRG size; wherein
- the DMRS reference point is an SC of a start RB of the second CORESET; and/or
- the PRG size is a PRG size for receiving a PDSCH in the second CORESET, and a PRG is divided from a start RB of the second CORESET.

Optionally, whether the terminal performs receiving by using the first receiving parameter as an assumption is indicated by the network. Optionally, in the case that the communications device is a terminal, whether the terminal performs receiving in the first CORESET is indicated by the network; or
- the terminal performs receiving in the first CORESET by using a resource parameter of the first CORESET as an assumption, and a first system information block SIB1 is successfully received, it is determined that transmission of the first CORESET is performed in the network.

Optionally, all RBs in the first CORESET are part of RBs of the second CORESET.

Optionally, a same resource is used for the first CORESET and the second CORESET to transmit system information.

The communications device provided in this embodiment of the present disclosure can implement processes implemented by the communications device in the method embodiment of FIG. 2. To avoid repetition, details are not described herein again. In addition, PDCCH receiving performance of the terminal can be improved.

Figure 8:
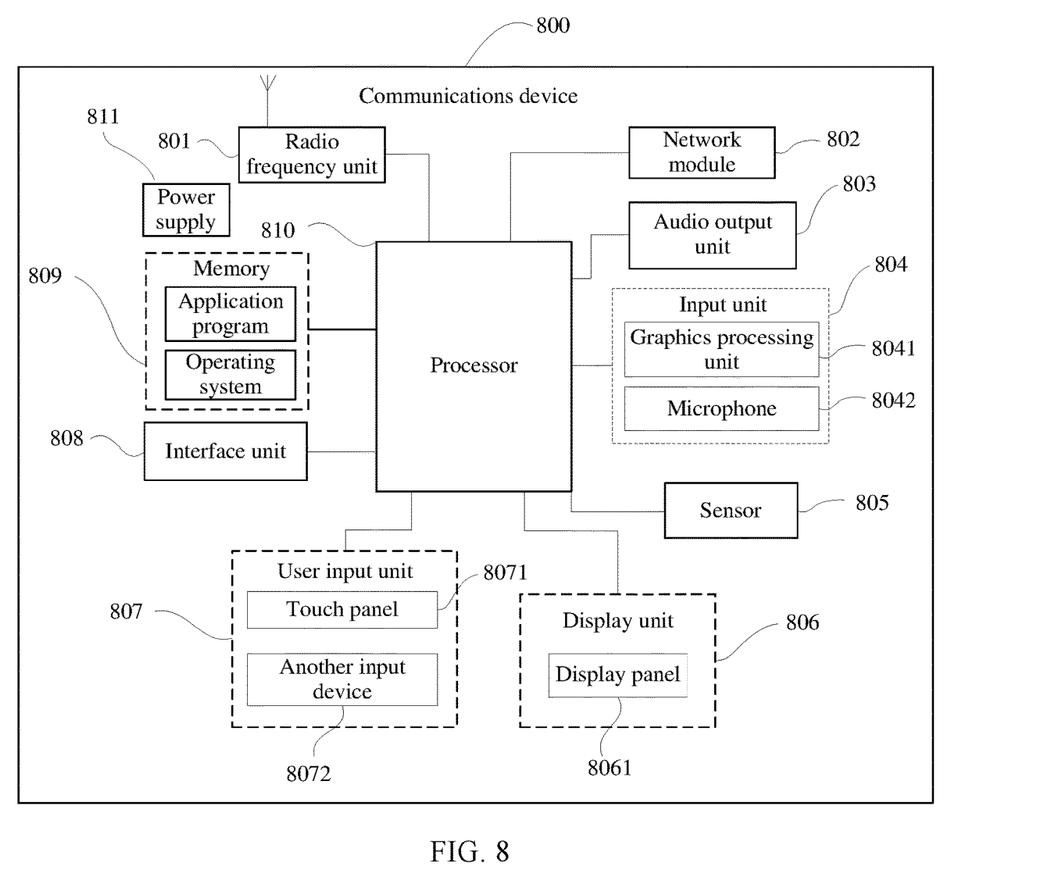
FIG. 8 is a structural diagram of another communications device according to an embodiment of the present disclosure.

FIG. 8 is a schematic diagram of a hardware structure of a communications device according to embodiments of the present disclosure. A structural diagram of the communications device in this embodiment is described by using a structural diagram of a terminal as an example.

A communications device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a robot, a wearable device, a pedometer, and the like.

The radio frequency unit 801 is configured to transmit a PDCCH in a first CORESET, where the number of RBs in the first CORESET is less than or equal to the number of RBs in a second CORESET, and the second CORESET is configured by higher layer signaling in a PBCH.

Optionally, the PDCCH is of a type-0 PDCCH.

Optionally, a resource parameter of the first CORESET is a default parameter or a resource parameter indicated by the network; or a resource parameter of the first CORESET is determined based on a resource parameter of the second CORESET.

Optionally, a resource parameter of the first CORESET is determined based on a correspondence between the resource parameter of the first CORESET and a resource parameter of the second CORESET, and the correspondence is indicated by the network.

Optionally, the resource parameter of the first CORESET includes at least one of:
bandwidth, a frequency location, a start RB, the number of symbols, or PDCCH search space.

Optionally, in the case that the start RB is a default parameter, the start RB is:
determined by performing offset on a start RB of the second CORESET; or
determined by performing offset on a start RB of an SSB; or
determined based on bandwidth of the second CORESET, bandwidth for SSB transmission, and bandwidth of the first CORESET.

Optionally, the RB in the first CORESET includes an RB used for transmitting an SSB, and/or all RBs in the first CORESET are included in an RB set of the second CORESET.

Optionally, the number of offset RBs between the start RB and the start RB of the SSB is a minimum offset value or a maximum offset value.

In the case that an RB in the first CORESET includes an RB used to transmit the SSB and/or all RBs in the first CORESET are included in an RB set of the second CORESET, the minimum offset value is the minimum number of offset RBs between the start RB and the start RB of the SSB.

In the case that an RB in the first CORESET includes an RB used to transmit the SSB and/or all RBs in the first CORESET are included in an RB set of the second CORESET, the maximum offset value is the maximum number of offset RBs between the start RB and the start RB of the SSB.

Optionally, the PDCCH search space is type-0 PDCCH search space; where
a monitoring occasion of the type-0 PDCCH search space is a monitoring occasion of type-0 PDCCH search space in the second CORESET; or
a monitoring occasion of the type-0 PDCCH search space is on a first OFDM symbol in a slot in which a monitoring occasion of type-0 PDCCH search space in the second CORESET is located, and the monitoring occasion of the type-0 PDCCH search space in the second CORESET is on a second OFDM symbol in the slot; or
a monitoring occasion of the type-0 PDCCH search space is an occasion with an offset relative to a monitoring occasion of type-0 PDCCH search space in the second CORESET.

Optionally, in the case that the communications device is a terminal, a DMRS configuration for receiving the physical downlink shared channel scheduled by the PDCCH in the first CORESET is as follows:
a DMRS configuration indicated in the PBCH and used for PDSCH reception; or
an offset of a DMRS configuration indicated in the PBCH and used for PDSCH reception; or
a default DMRS configuration; or
a configuration of an OFDM symbol in which a first OFDM symbol of a type-A DMRS is located.

Optionally, in the case that the communications device is a terminal, the transmitting the PDCCH in the first CORESET includes:
monitoring the PDCCH in PDCCH search space in the first CORESET; where the monitoring PDCCH includes: performing monitoring by using a default first monitoring parameter as an assumption, or performing monitoring by using a second monitoring parameter, where the second monitoring parameter corresponds to a monitoring parameter for monitoring the PDCCH in PDCCH search space in the second CORESET.

Optionally, the first monitoring parameter includes at least one of:
a DMRS reference point, the number of downlink control information DCI bits, a resource element group REG bundle size, or an interleave size.

Optionally, the DMRS reference point is a start subcarrier SC of a start RB of the second CORESET; and/or
the quantity of DCI bits is a quantity of DCI bits of a corresponding format for monitoring a PDCCH in PDCCH search space in the second CORESET; and/or
the REG bundle size is a REG bundle size for monitoring a PDCCH in PDCCH search space in the second CORESET; and/or
the interleave size is an interleave size for monitoring a PDCCH in PDCCH search space in the second CORESET.

Optionally, whether the terminal performs monitoring by using the first monitoring parameter as an assumption is indicated by a network.

Optionally, in the case that the communications device is a terminal, the radio frequency unit 801 is further configured to:
receive a PDSCH scheduled by a PDCCH, where the PDSCH is received in a first BWP, and an RB included in the first BWP is the same as an RB included in the first CORESET; where
the PDSCH is received by using a first receiving parameter as an assumption, the first receiving parameter corresponds to a second receiving parameter, and the second receiving parameter is a receiving parameter of a PDSCH scheduled by a type-0 PDCCH transmitted in the second CORESET.

Optionally, the first receiving parameter includes at least one of:
a DMRS reference point or a precoding resource block group PRG size; wherein
the DMRS reference point is an SC of a start RB of the second CORESET; and/or
the PRG size is a PRG size for receiving a PDSCH in the second CORESET, and a PRG is divided from a start RB of the second CORESET.

Optionally, whether the terminal performs receiving by using the first receiving parameter as an assumption is indicated by the network. Optionally, in the case that the communications device is a terminal, whether the terminal performs receiving in the first CORESET is indicated by the network; or
the terminal performs receiving in the first CORESET by using a resource parameter of the first CORESET as an assumption, and a first system information block SIB1 is successfully received, it is determined that transmission of the first CORESET is performed in the network.

Optionally, all RBs in the first CORESET are part of RBs of the second CORESET.

Optionally, a same resource is used for the first CORESET and the second CORESET to transmit system information.

The foregoing communications device can improve PDCCH receiving performance of the terminal.

It should be understood that, in this embodiment of the present disclosure, the radio frequency unit 801 may be configured to receive and send information or receive and send a signal in a call process. For example, after downlink data from a base station is received, the processor 810 processes the downlink data. In addition, uplink data is sent to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device by using a wireless communication system.

The terminal provides wireless broadband Internet access for the user by using the network module 802, for example, helping the user send and receive an email, browsing a web page, and accessing streaming media.

The audio output unit 803 may convert audio data received by the radio frequency unit 801 or the network module 802 or stored in the memory 809 into an audio signal and output as sound. In addition, the audio output unit 803 may further provide audio output (for example, call signal receiving sound or message receiving sound) related to a specific function performed by the terminal 800. The audio output unit 803 includes a loudspeaker, a buzzer, a telephone receiver, and the like.

The input unit 804 is configured to receive an audio or video signal. The input unit 804 may include a graphics processing unit (GPU) 8041 and a microphone 8042. The graphics processing unit 8041 processes image data of a static picture or a video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. The processed audio data may be output by being converted into a format that may be sent to a mobile communications base station by using the radio frequency unit 801 in a telephone call mode.

The terminal 800 further includes at least one sensor 805, such as an optical sensor, a motion sensor, and another sensor. For example, the optical sensor includes an ambient light sensor and a proximity sensor. The ambient light sensor may adjust luminance of the display panel 8061 based on brightness of ambient light, and the proximity sensor may disable the display panel 8061 and/or backlight when the terminal 800 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 805 may further include a fingerprint sensor, a pressure sensor, an iris sensor, a molecular sensor, a gyroscope, a barometer, a hygrometer, a thermometer, an infrared sensor, and the like. This is not described herein.

The display unit 806 is configured to display information entered by the user or information provided for the user. The display unit 806 may include a display panel 8061, and the display panel 8061 may be configured in a form of a liquid crystal display (LCD), an organic light-emitting diode (OLED), or the like.

The user input unit 807 may be configured to receive input digit or character information and generate key signal input related to user setting and function control of the terminal. For example, the user input unit 807 includes a touch panel 8071 and another input device 8072. The touch panel 8071, also referred to as a touchscreen, may collect a touch operation performed by the user on or near the touch panel 8071 (for example, an operation performed by the user on or near the touch panel 8071 by using any suitable object or accessory such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented by using multiple types such as a resistive type, a capacitive type, an infrared ray, and a surface acoustic wave. The user input unit 807 may include another input device 8072 in addition to the touch panel 8071. The another input device 8072 may include but is not limited to one or more of a physical keyboard, a function key (such as a volume control key or an on/off key), a trackball, a mouse, a joystick, and the like. Details are not described herein.

Optionally, the touch panel 8071 may cover the display panel 8061. After detecting the touch operation on or near the touch panel 8071, the touch panel 8061 transmits the touch operation to the processor 810 to determine a type of a touch event, and then the processor 810 provides corresponding visual output on the display panel 8061 based on the type of the touch event. In FIG. 8, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface connecting an external apparatus to the terminal 800. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 808 may be configured to receive input (for example, data information and power) from the external apparatus and transmit the received input to one or more elements in the terminal 800, or may be configured to transmit data between the terminal 800 and the external apparatus.

The memory 809 may be configured to store a software program and various data. The memory 809 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 809 may include a high-speed random access memory, and may further include a non-volatile memory such as at least one magnetic disk storage component, a flash memory component, or another volatile solid-state storage component.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 may include one or more processing units. Optionally, the processor 810 may be integrated with an application processor and a modem processor. The application processor mainly processes an operating system, a user interface, an application program, and the like, and the modem processor mainly processes wireless communication. It may be understood that the modem processor may also not be integrated into the processor 810.

The terminal 800 may further include the power supply 811 (such as a battery) that supplies power to each component. Optionally, the power supply 811 may be logically connected to the processor 810 by using a power management system, to implement functions such as charging, discharging, and power consumption management by using the power management system.

In addition, the terminal 800 includes some function modules not shown, and details are not described herein.

Optionally, an embodiment of the present disclosure further provides a terminal, including a processor 810, a memory 809, and a computer program that is stored in the memory 809 and executable on the processor 810. When the computer program is executed by the processor 810, each process of the foregoing transmission method embodiments can be implemented, and a same technical effect can be achieved. To avoid repetition, details are not described herein again.

An embodiment of the present disclosure further provides a non-transitory computer-readable storage medium. A computer program is stored in the non-transitory computer-readable storage medium. When being executed by a processor, the foregoing transmission method provided in the embodiments of this application can be implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

What is claimed is:

1. A transmission method, applied to a communications device and comprising:
    transmitting a physical downlink control channel (PDCCH) in a first control resource set (CORESET), wherein number of resource blocks (RBs) in the first CORESET is less than or equal to number of RBs in a second CORESET, and the second CORESET is configured by higher layer signaling in a physical broadcast channel (PBCH);
    wherein a resource parameter of the first CORESET is a default parameter or a resource parameter indicated by a network; or
    a resource parameter of the first CORESET is determined based on a resource parameter of the second CORESET;
    wherein the resource parameter of the first CORESET comprises at least one of:
    bandwidth, a frequency location, a start RB, number of symbols, or PDCCH search space;
    wherein in a case that the start RB is a default parameter, the start RB is:
    determined by performing offset on a start RB of the second CORESET; or
    determined by performing offset on a start RB of a synchronization signal block (SSB); or
    determined based on bandwidth of the second CORESET, bandwidth for SSB transmission, and bandwidth of the first CORESET;
    wherein number of offset RBs between the start RB and a start RB of the SSB is a minimum offset value or a maximum offset value; wherein
    in a case that an RB in the first CORESET comprises an RB used to transmit the SSB or all RBs in the first CORESET are comprised in an RB set of the second CORESET, the minimum offset value is minimum number of offset RBs between the start RB and the start RB of the SSB; and
    in a case that an RB in the first CORESET comprises an RB used to transmit the SSB or all RBs in the first CORESET are comprised in an RB set of the second CORESET, the maximum offset value is maximum number of offset RBs between the start RB and the start RB of the SSB.

2. The method according to claim 1, wherein the PDCCH is a type-0 PDCCH.

3. The method according to claim 1, wherein the resource parameter of the first CORESET is determined based on a correspondence between the resource parameter of the first CORESET and the resource parameter of the second CORESET, and the correspondence is indicated by a network.

4. The method according to claim 1, wherein the RBs in the first CORESET comprise RBs for SSB transmission, or all the RBs in the first CORESET are comprised in an RB set of the second CORESET.

5. The method according to claim 1, wherein the PDCCH search space is type-0 PDCCH search space; wherein
   a monitoring occasion of the type-0 PDCCH search space is a monitoring occasion of type-0 PDCCH search space in the second CORESET; or
   a monitoring occasion of the type-0 PDCCH search space is on a first orthogonal frequency division multiplexing (OFDM) symbol in a slot in which a monitoring occasion of type-0 PDCCH search space in the second CORESET is located, and the monitoring occasion of the type-0 PDCCH search space in the second CORESET is on a second OFDM symbol in the slot; or
   a monitoring occasion of the type-0 PDCCH search space is an occasion with an offset relative to a monitoring occasion of type-0 PDCCH search space in the second CORESET.

6. The method according to claim 1, wherein in a case that the communications device is a terminal, a demodulation reference signal (DMRS) configuration for receiving a physical downlink shared channel (PDSCH) scheduled by a PDCCH in the first CORESET is as follows:
   a DMRS configuration indicated in the PBCH and used for PDSCH reception; or
   an offset of a DMRS configuration indicated in the PBCH and used for PDSCH reception; or
   a default DMRS configuration; or
   a configuration of an orthogonal frequency division multiplexing (OFDM) symbol in which a first OFDM symbol of a type-A DMRS is located.

7. The method according to claim 1, wherein in a case that the communications device is a terminal, the method further comprises:
   receiving a physical downlink shared channel (PDSCH) scheduled by a PDCCH, wherein the PDSCH is received in a first bandwidth part (BWP), and an RB comprised in the first BWP is same as an RB comprised in the first CORESET; wherein
   the PDSCH is received by using a first receiving parameter as an assumption, the first receiving parameter corresponds to a second receiving parameter, and the second receiving parameter is a receiving parameter of a PDSCH scheduled by a type-0 PDCCH transmitted in the second CORESET.

8. The method according to claim 7, wherein the first receiving parameter comprises at least one of:
   a demodulation reference signal (DMRS) reference point or a precoding resource block group (PRG) size; wherein
   the DMRS reference point is an SC of a start RB of the second CORESET; or
   the PRG size is a PRG size for receiving a PDSCH in the second CORESET, and a PRG is divided from a start RB of the second CORESET.

9. The method according to claim 1, wherein in a case that the communications device is a terminal, whether the terminal performs receiving in the first CORESET is indicated by a network; or
   the terminal performs receiving in the first CORESET by using the resource parameter of the first CORESET as an assumption, and if a first system information block (SIB1) is successfully received, it is determined that transmission of the first CORESET is performed in a network.

10. The method according to claim 1, wherein all RBs in the first CORESET are part of RBs in the second CORESET.

11. The method according to claim 10, wherein a same resource is used for the first CORESET and the second CORESET to transmit system information.

12. The method according to claim 1, wherein in a case that the communications device is a terminal, the transmitting a PDCCH in a first CORESET comprises:
   monitoring the PDCCH in PDCCH search space in the first CORESET; wherein
   the monitoring PDCCH comprises: performing monitoring by using a default first monitoring parameter as an assumption, or performing monitoring by using a second monitoring parameter, wherein the second monitoring parameter corresponds to a monitoring parameter for monitoring the PDCCH in PDCCH search space in the second CORESET.

13. The method according to claim 12, wherein the first monitoring parameter comprises at least one of:
   a demodulation reference signal (DMRS) reference point, number of downlink control information (DCI) bits, a resource element group (REG) bundle size, or an interleave size.

14. The method according to claim 13, wherein the DMRS reference point is a start subcarrier (SC) of a start RB of the second CORESET; or
   the number of DCI bits is number of DCI bits of a corresponding format for monitoring a PDCCH in PDCCH search space in the second CORESET; or
   the REG bundle size is a REG bundle size for monitoring a PDCCH in PDCCH search space in the second CORESET; or
   the interleave size is an interleave size for monitoring a PDCCH in PDCCH search space in the second CORESET.

15. A communications device, comprising: a memory, a processor, and a program that is stored in the memory and executable on the processor, wherein the program, when executed by the processor, causes the communications device to perform:
   transmitting a physical downlink control channel (PDCCH) in a first control resource set (CORESET), wherein number of resource blocks (RBs) in the first CORESET is less than or equal to number of RBs in a second CORESET, and the second CORESET is configured by higher layer signaling in a physical broadcast channel (PBCH);
   wherein a resource parameter of the first CORESET is a default parameter or a resource parameter indicated by a network; or
   a resource parameter of the first CORESET is determined based on a resource parameter of the second CORESET;
   wherein the resource parameter of the first CORESET comprises at least one of:
   bandwidth, a frequency location, a start RB, number of symbols, or PDCCH search space;
   wherein in a case that the start RB is a default parameter, the start RB is:
   determined by performing offset on a start RB of the second CORESET; or
   determined by performing offset on a start RB of a synchronization signal block (SSB); or determined based on bandwidth of the second CORESET, bandwidth for SSB transmission, and bandwidth of the first CORESET;

wherein number of offset RBs between the start RB and a start RB of the SSB is a minimum offset value or a maximum offset value; wherein in a case that an RB in the first CORESET comprises an RB used to transmit the SSB or all RBs in the first CORESET are comprised in an RB set of the second CORESET, the minimum offset value is minimum number of offset RBs between the start RB and the start RB of the SSB; and in a case that an RB in the first CORESET comprises an RB used to transmit the SSB or all RBs in the first CORESET are comprised in an RB set of the second CORESET, the maximum offset value is maximum number of offset RBs between the start RB and the start RB of the SSB.

16. The communications device according to claim 15, wherein the PDCCH is a type-0 PDCCH.

17. The communications device according to claim 15, wherein the resource parameter of the first CORESET is determined based on a correspondence between the resource parameter of the first CORESET and the resource parameter of the second CORESET, and the correspondence is indicated by a network.

18. A non-transitory computer-readable storage medium, wherein the non-transitory computer-readable storage medium stores a computer program, and the computer program, when executed by a processor of a communications device, causes the communications device to perform:

transmitting a physical downlink control channel (PDCCH) in a first control resource set (CORESET), wherein number of resource blocks (RBs) in the first CORESET is less than or equal to number of RBs in a second CORESET, and the second CORESET is configured by higher layer signaling in a physical broadcast channel (PBCH);

wherein a resource parameter of the first CORESET is a default parameter or a resource parameter indicated by a network; or a resource parameter of the first CORESET is determined based on a resource parameter of the second CORESET;

wherein the resource parameter of the first CORESET comprises at least one of:

bandwidth, a frequency location, a start RB, number of symbols, or PDCCH search space;

wherein in a case that the start RB is a default parameter, the start RB is:

determined by performing offset on a start RB of the second CORESET; or determined by performing offset on a start RB of a synchronization signal block (SSB); or determined based on bandwidth of the second CORESET, bandwidth for SSB transmission, and bandwidth of the first CORESET;

wherein number of offset RBs between the start RB and a start RB of the SSB is a minimum offset value or a maximum offset value; wherein in a case that an RB in the first CORESET comprises an RB used to transmit the SSB or all RBs in the first CORESET are comprised in an RB set of the second CORESET, the minimum offset value is minimum number of offset RBs between the start RB and the start RB of the SSB; and in a case that an RB in the first CORESET comprises an RB used to transmit the SSB or all RBs in the first CORESET are comprised in an RB set of the second CORESET, the maximum offset value is maximum number of offset RBs between the start RB and the start RB of the SSB.

19. The non-transitory computer-readable storage medium according to claim 18, wherein the PDCCH is a type-0 PDCCH.

20. The non-transitory computer-readable storage medium according to claim 18, wherein the resource parameter of the first CORESET is determined based on a correspondence between the resource parameter of the first CORESET and the resource parameter of the second CORESET, and the correspondence is indicated by a network.

* * * * *